Dec. 4, 1962
E. R. SCHWARTZ
3,066,816
COMBINED APPROACH PLATE AND BUMPER
APPARATUS FOR VEHICLE PLATFORM
Filed March 11, 1960
2 Sheets-Sheet 1
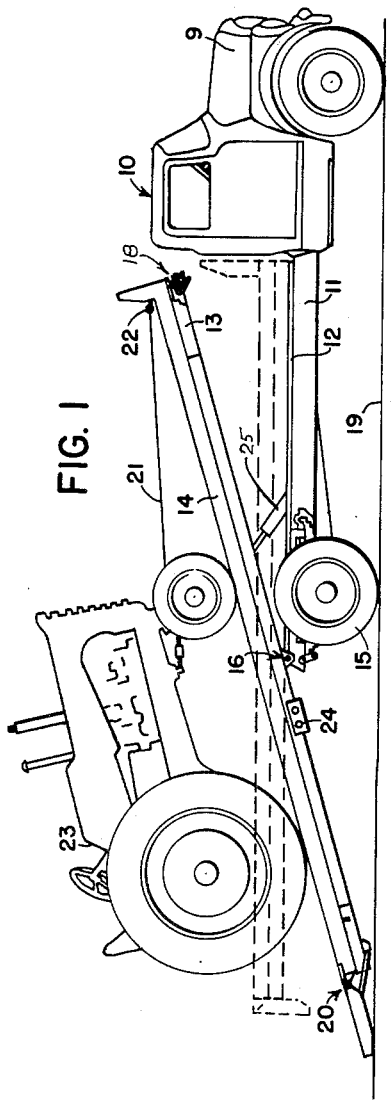
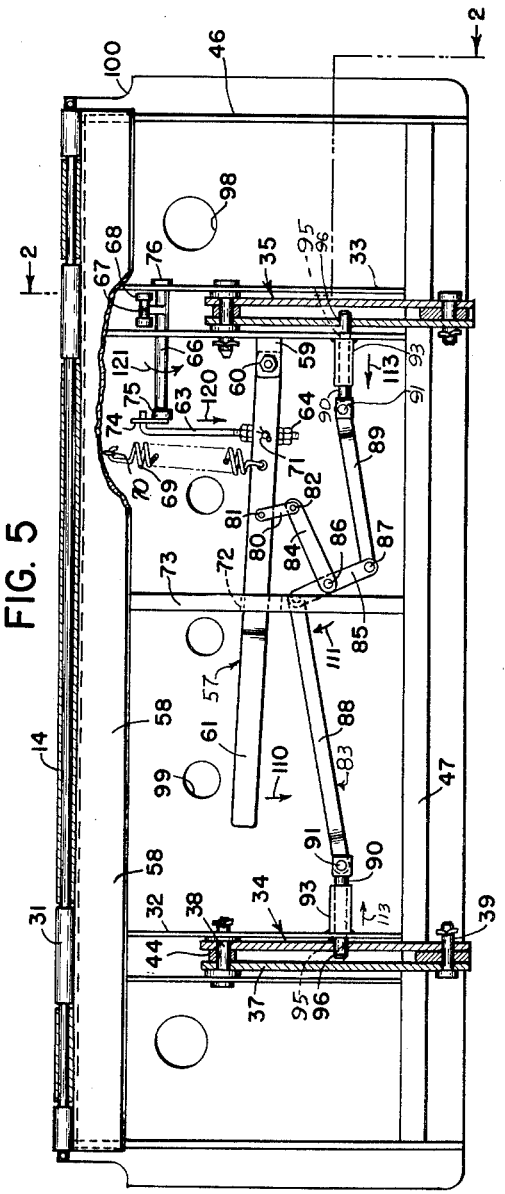
*INVENTOR.*
ELMER R. SCHWARTZ
BY Dugger & Johnson
ATTORNEYS

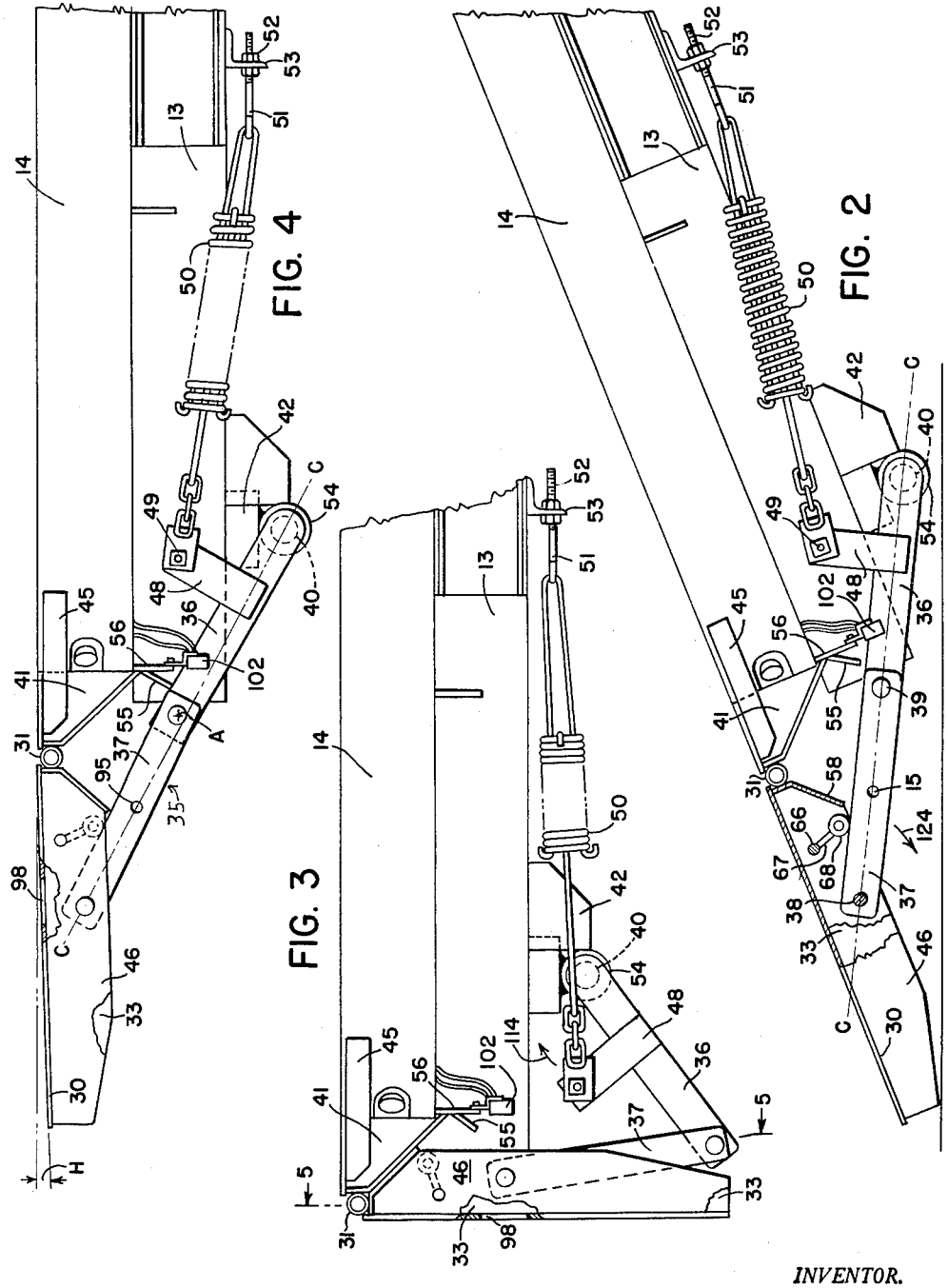

United States Patent Office 3,066,816
Patented Dec. 4, 1962

3,066,816
COMBINED APPROACH PLATE AND BUMPER
APPARATUS FOR VEHICLE PLATFORM
Elmer R. Schwartz, Lester Prairie, Minn.
Filed Mar. 11, 1960, Ser. No. 14,256
7 Claims. (Cl. 214—505)

This invention relates to new and improved combined approach plate and bumper apparatus for a vehicle having a tiltable platform. More particularly this invention relates to new and improved approach plate apparatus mounted on the rear of a vehicle platform that in a transport position serves as a bumper and in a loading position serves as an extension of the platform.

It is an object of this invention to provide new and improved combined approach plate and bumper apparatus to be mounted on the rear of a vehicle platform. A further object of this invention is to provide for a vehicle new and improved combined approach plate and bumper apparatus that is releasably locked in either a transport position where it serves as a bumper or in a loading position in which it serves as an extension of a tiltable vehicle platform. A still further object of this invention is to provide for a vehicle platform new and improved combined approach plates and bumper apparatus that can be easily raised and lowered between a bumper position and a position forming an extension of said platform even though the approach plate is quite heavy.

An additional object of this invention is to provide new and improved counterbalanced approach plate apparatus that is mountable on the rear of a vehicle platform. A still additional object of this invention is to provide an approach plate apparatus for a vehicle that may be readily moved to and releasably locked in either a bumper position or an extension position.

Other and further objects of this invention are those inherent in the invention herein illustrated, described, and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings in which the corresponding numerals refer to the same parts and in which:

FIGURE 1 is a side view of a truck having a heavy vehicle partially loaded thereon, the truck platform being shown in a loading position in solid lines, and in a transport position in dotted lines;

FIGURE 2 is an enlarged fragmentary vertical elevation, part in section, of the rear portion of the platform and the combined approach plate and bumper apparatus attached to the platform illustrated in FIGURE 1, said view being generally taken along the line and in the direction of the arrows 2—2 of FIGURE 5 to show the approach plate and associated linkage in a loading position;

FIGURE 3 is a side vertical elevational view similar to FIGURE 2, except that the approach plate apparatus is shown in a transport position wherein it serves as a bumper;

FIGURE 4 is a side vertical elevational view similar to FIGURE 2 except that the tiltable platform is in the transport position but the combined approach plate and bumper apparatus is in a loading position.

FIGURE 5 is a rear vertical sectional view of the operating linkages, the over center lock release mechanism and the transport position lock mechanism of the approach plate apparatus, said view being generally taken along the line and looking in the direction of the arrows 5—5 of FIGURE 3.

In vehicles having elongated tiltable platforms that extend substantially rearwardly of the rear wheels so that said platform may be readily tilted to a position to in part, serve as a ramp for loading heavy vehicles on said platform, it is often desirable that an extension (approach plate) be provided on the rear of the platform in order to decrease the angle required for ground contact and subsequent loading of a heavy object on the platform. In a load position, the aforementioned extension or approach plate is often desirable and a necessary accessory to the ramp hoist, however, when the platform is returned to its transport position, the usefulness of the approach plate is relatively minor at best and often becomes a liability. That is, because of the position of the approach plate on a tiltable platform relative the front and rear wheels of the vehicle upon which the tiltable paltform is mounted, the cargo carrying capacity of the approach plate is limited to light bulk loads. Further the legal length and overloading restrictions in several states regulate the overall length of the platform and an approach plate. Additionally some states have enacted "Bumper" regulations for overhanging bodies and other states are expected to follow their example.

To overcome the aforementioned limitations and restrictions, it is desirable to have an approach plate which can be hinged down from the rear of the platform when the platform is in the transport position, and hinged up to provide a platform extension when said platform is in a loading position. Further to provide an easily operated hinged extension in the form of an approach plate that alternately serves satisfactorily as a heavy duty approach plate to facilitate loading objects on the platform and as a substantial bumper that satisfies the aforementioned legal requirements, it is necessary to provide bracing linkages that facilitate raising and lowering the approach plate. In order to overcome the aforementioned problem, this invention has been made.

Referring now to FIGURE 1, there is illustrated a truck generally designated 10, having front and rear wheels 15, chassis 11, a subframe 12 mounted on the chassis to extend rearwardly of the cab 9, and a tiltable platform 14 that includes a platform frame 13 pivotally secured at 16 to the subframe 12. It is to be noted that the length of the portion of the platform forwardly of the rear wheels is less than the portion rearwardly of said wheels and that portion of the platform forwardly of the pivot 16 is almost as long as the portion rearwardly of said pivot. The combined approach plate bumper assembly, generally designated 20, of this invention is secured to the platform in a manner to selectively form an extension of said platform (see FIGURE 2) to facilitate loading onto the platform a heavy object such as a tractor 23, and to serve as a bumper (see FIGURE 3) when the truck is being driven over a road. Appropriate truck bed hold-down latch apparatus generally designated 18, such as described in my copending application, Serial Number 857,799 may be provided for releasably retaining the platform in a transport position.

A hoist cable 21 having one end thereof connected to appropriate hydraulically operated apparatus (not shown) is extended over the front sheave 22 and the other end connected to the tractor. By operating appropriate controls located at the control panel 24, the aforementioned hydraulically operated apparatus may be actuated to pull the tractor onto the platform when the platform is in a tilted condition such as illustrated in full lines in FIGURE 1. Also located at the control panel are suitable controls for actuating the ramp hoist tandem piston-cylinder combination 25 for selectively raising and lowering the platform.

The combined approach plate and bumper assembly 20 includes an approach plate 30 of heavy construction that is hingedly secured at its upper end by hinges 31 to the extension bracket 41 which in turn is mounted on the rear end of the tiltable platform and in part retained in position by reinforcing members 45 welded to said bracket and platform. The platform includes on either transverse side thereof longitudinally extending flange 46, two spaced depending flanges 32 adjacent the righthand flange 46 and two spaced depending flanges 33 adjacent the lefthand flange 46. One end of the toggle linkage 34 is pivotally connected at 38 to the mid-portion of the depending flanges 32 while the opposite end of the toggle linkage is fixedly secured to one end of the transverse shaft 40 to extend radially therefrom. The shaft is rotatably mounted in a pair of spaced pivot bearings 54. The pivot bearings in turn are mounted on pivot brackets 42 that are secured to the lower rear portion of the lift frame forwardly of the bracket 41. Similarly toggle linkage 35 is pivotally connected at one end to the depending flanges 33 and at the opposite end fixedly secured to the opposite end of the shaft 40. Each of the toggle linkages 34, 35 includes an inner arm 36 which at the opposite end from the pivot member 40 is pivotally connected by a pivot member 39 to the adjacent ends of the outer arms 37. The outer arms are retained in spaced relation at one end by an inner arm and at the opposite end by a spacer 44 mounted on the pivot member 38. The aforementioned inner and outer arms are of a length and pivotally connected so that the respective pivot axes and longitudinal axes of the arms will be located in the plane C—C when the approach plate is even with the top of the platform (see FIGURE 2).

Fixedly secured to the mid-portion of the inner arm of the toggle linkage 35 is an upwardly extending bar 48. One end of the spring assembly 50 is pivotally connected at 49 to the upper end of the aforementioned bar. The opposite end of the spring assembly includes a threaded rod 51 which is extended through an appropriate aperture formed in the angle bracket 53 and retained in an adjusted position by nuts 52 threaded on the rod on opposite sides of the angle bracket. The angle bracket is welded to the under portion of the lift frame forwardly of the bracket 42 and mounts said opposite end of spring assembly at a higher elevation than the pivot axis of the pivot 40.

A stop 55 is welded to the bracket 41 to overhang toggle linkage 34. Similarly a second stop (not shown) is welded to the aforementioned bracket to overhang the toggle linkage 35. The lower end of the stop is located a sufficient distance above the plane C—C passed through the pivot axes of pivots 38 and 40 to permit toggle linkage to be spring urged to overcenter locked position wherein the pivot axis of pivot 39 is located at A and at the same time prevent said toggle linkages being moved much past the aforementioned overcenter locked position (see FIGURE 4).

The spring assembly is arranged so that together with the mechanical advantage of the toggle linkage, enough of the weight of the approach plate is overcome to make its raising and lowering an easy task. Once the approach plate is in a transport position, the toggle linkage is overcenter on the opposite side of a line drawn through the pivot axes of pivots 38, 40 from position A and remains in this position due to the weight of the approach plate and the linkage connections thereto.

In order to easily force the toggle linkage to overcenter position opposite position A, there is provided the hand-lever and linkage, generally designated 57, described hereinafter. One end of the hand lever 61 is secured by the pivot 60 to the clevis bracket 59 which in turn is secured to the intermediate portion of the depending flange 33 to face toward the depending flange 32. The mid-portion of the lever extends through the elongated slot 72 formed in the center longitudinal brace 73 of the approach plate.

One end of the hook rod 63 is pivotally connected at 71 to the hand lever outwardly from the pivot 60. The hooked rod has an elongated slot in which the pivot 71 is extended and nuts 64 threaded thereon for adjusting the effective length of the rod. The opposite hook end of the rod 63 extended through an aperture formed in the outer end of crank arm 74. The opposite end of the crank arm is fixedly secured to one end of the shaft 66 which is journaled for rotation in blocks 75, 76, that are secured to the approach plate. Secured to the crank shaft to extend radially outwardly therefrom in the same direction of the crank arm is a T-member 67. Rollers 68 are mounted rotatably on the crossbar of the T-member which is spaced outwardly from the shaft. The T-member is of a length to position the rollers to bear against the outer arm of the toggle member 35 so that upon pivoting lever 61 in the direction of arrow 110, the toggle linkages are forced from an overcentered locked position A to permit the approach plate to be lowered. If necessary, nuts 64 may be turned to properly position the rollers relative to the toggle linkages. A spring 69 is connected at one end in the aperture in hand lever that is adjacent pivot 71 and at the opposite end to an eye bolt 70 mounted beneath the inturned flange 58 of the approach plate and secured to said approach plate. The spring 69 constantly urges the lever to rotate in the direction to move the rollers away from the toggle linkages (opposite arrow 121).

In order to hold the approach plate in a depending transport position wherein it will serve as a bumper (see FIGURES 4 and 5), there is provided the lock mechanism 83. The lock mechanism includes a short link 80 that is pivotally connected at one end by pivot 81 to the mid-portion of the hand lever and at the opposite end to the outer end of the radial arm 84 by the pivot 82. The inner end of the radial arm is fixedly secured to the mid-portion of the operator arm 85. The operator arm and the radial arm are rotatably secured on the stand 86 which is in turn fixedly secured to the underside of the approach plate. One of the outer ends of the operator arm is connected by pivot 87 to one end of the connector arm 89. The opposite end of the connector arm in turn is pivotally connected by pivot 91 to the clevised end of the lock pin 90. The lock pin 90 is slidably retained in a sleeve 93 that is welded to the same flange 33 to which the clevis bracket 59 is secured.

The opening in the sleeve 93 is co-extensive with an aperture 95 formed in the flange 33 while an aperture 96 is formed in the adjacent outer arm of the toggle linkage 35 to permit the lock pin to be extended through aperture 95 into aperture 96 when the approach plate is in a transport position.

Similarly a connector arm 88 is pivotally connected at one end to the opposite end of the control arm and at the other end pivotally connected by pivot 91 to a second lock pin 90. The second lock pin in turn is slidably retained in a sleeve 93 that is welded to the depending flange 32 in position to permit the pin to be extended through aperture 95 in the depending flange and into the aperture 96 formed in the adjacent outer arm of the toggle linkage 34.

A plurality of openings 98 and 99 may be formed in the approach plate in order to permit the signal, stop, and tail lights 102 mounted on the chassis to be observed when the approach plate is in a transport position. Likewise cutouts 100 may be provided in the outer transverse edges of the approach plate to permit observation of the clearance lights when the approach plate is in a transport position. Additionally, cutouts (not shown) in the appropriate part of the approach plate, permit license plates to be observed when the approach plate is in a transport position.

The structure of the combined approach plate and bumper apparatus having been described, the operation thereof will now be briefly set forth. Assuming that the combined approach plate and bumper assembly is in a load position as illustrated in FIGURE 3 and that it is now desired to tilt the platform to the solid line position illustrated in FIGURE 1 in order that the vehicle 23 may be loaded thereon; first the hand lever 61 is rotated in the direction of the arrow 110 whereupon the short link 89 causes the radial arm and thus the operator arm to rotate on the stand 86 in the direction of the arrow 111. The rotation of the operator arm moves the connector arms 88, 89 to pull the lock pins in the direction of the adjacent arrow 113, thereby withdrawing said pins from the apertures 96 formed in the respective outer arm 37 of the toggle linkages 34, 35. The length of the slot 72 is chosen to prevent the hand lever from being rotated a sufficient amount to completely pull the pins out of the respective sleeves 93.

As may be noted in FIGURE 3, the spring assembly constantly urges the inner arms of the toggle linkages to rotate about the shaft 40 in the direction of the arrow 114. The spring assembly and toggle linkages effectuate a counter-balancing that permits easy raising and lowering of the plate. That is, when the approach plate is to be moved from a transport position such as illustrated in FIGURE 3, to the position illustrated in FIGURE 4, the spring assembly acting through the bar 48 tends to rotate the arm in a direction of the arrow 114 which in turn tends to move the approach plate to the position illustrated in FIGURE 4. It is to be noted that when the approach plate is in a depending position and when it is easiest to be manually moved toward a horizontal position, the force exerted by the spring assembly through the toggle linkages is not as great as that when the approach plate is rotated to a position more nearly level with the platform. The spring assembly through the toggle linkages effectively provides a greater force tending to move the approach plate as it is moved to a load position. Once the approach plate has been elevated to a plane level with the platform, the pivotal axis of the pivot members 38, 39, and 40 all lie in the plane C—C. Then the spring assembly acts to pull the pivot axis of pivot 39 overcenter to position A (see FIGURE 4) wherein the inner arm abuts against the stop to prevent the approach plate being lowered a greater angular distance than the distance H as illustrated and the toggle linkages are retained in an overcenter locked position. The toggle linkages in position A will either abut or be closely adjacent to the rollers 68.

By operating the control 24 to move the platform to a tilted position, the back end of the approach plate is lowered to rest on ground 19. In this position the toggle linkages permit the approach plate to be rotated through the elevation H so that the pivots 38, 39, and 40 are all located in the plane C—C while at the same time the approach plate is limited in the amount of clockwise rotation (FIGURE 2) since the inturned flange 58 will engage the inner arms. Upon moving the platform to a horizontal position (see dotted line position FIGURE 1), the spring assembly will again pull the toggle linkages to the position illustrated in FIGURE 4.

In order to lower the approach plate so that it will serve as a bumper, the handle lever 61 is rotated in the direction of the arrow 110 whereupon the hooked rod 63 will be moved in the direction of the arrow 120. The hooked rod in turn will cause the shaft 66 to rotate in the direction of the arrow 121 whereby the rollers are rotated in the same direction. Since shaft 66 is located intermediate the pivots 38, 40 and the length of the T-member 67 is greater than the distance from the shaft to the toggle linkage in a "straight condition," upon rotating the shaft in the direction of arrow 121, the outer arms of the toggle linkage 35 are caused to rotate about the pivot 38 in the direction of the arrow 124 until the pivot axis of pivot 39 crosses over to the opposite side of the centerline C—C from position A. This movement is transmitted through the adjacent inner arm and pivot shaft 40 to the other inner arm and outer arms of toggle linkage 34. At this time, the spring assembly 50 will operate to urge the approach plate to remain in a loading position and thus resist the movement of the approach plate from said load position to the transport position. Once the approach plate is again in the transport position, apertures 95, 96 will again be aligned in order that pin 91 may be extended therethrough. Spring 69 urges the lever and the associate linkages to move the pins into the apertures 96 for locking the approach plate in a transport position wherein it serves as a bumper. It is preferred that the spring 50 has spring characteristics and nuts 52 are adjusted so that the spring will hold the approach plate in a loading position even after the toggle linkage is forced to overcenter the other way (opposite position A) by means of the hand lever, the associated linkages and the roller; and that a slight down pressure must be exerted on the rear of the approach plate to cause it to descend to a depending position.

From the preceding description, it is readily apparent that the approach plate may be hinged down on the rear of the platform when in a transport position and hinged up to form an extension of the platform when in a loading position. Thus in the transport position, the overall length and the overhang of the unit is shortened by the longitudinal length of the approach plate. In the transport position, the hinged approach plate becomes a substantial bumper and thus satisfies legal requirements of a number of states. Also since the structural requirements of the approach plate for loading heavy objects make it difficult and cumbersome to raise and lower said approach plate, the provision of a manually operated spring counterbalanced linkage means greatly facilitates moving the approach plate between the transport position and the loading position.

As many widely apparently different embodiments of this invention may be made without departing from the spirit and scope thereof, it is to be understood that I do not limit myself to the specific embodiments herein.

What I claim is:

1. A vehicle having a frame, a platform mounted on said frame, an approach plate hingedly mounted on one end of said platform for movement between a generally vertical position depending from said platform and a generally horizontal position extending outwardly from said platform, a toggle linkage pivotally connected at one end to the approach plate and at the opposite end to the underside of the platform, said toggle linkage being movable to an overcenter locked position when the approach plate is generally horizontal and the platform is in a horizontal position, means connected to the platform for facilitating the movement of the approach plate between the horizontal position and the vertical position and for urging the toggle linkage to the overcenter locked position, to releasably retain the approach plate in a horizontal position and stop means mounted on the platform for releasably retaining the toggle linkage in an overcenter locked position.

2. The structure of claim 1 further characterized in that the means for facilitating the movement of the approach plate is a counter balance spring assembly and that the means mounted on the approach plate includes a lever movably mounted on the approach plate, a lock pin, means for mounting said lock pin to engage the toggle linkage to hold said toggle linkage for retaining the approach plate in a vertical position and linkage means for connecting said lever to the lock pin for selectively moving said lock into and out of engagement with the toggle linkage.

3. A vehicle having a frame, a platform mounted on said frame, an approach plate hingedly mounted on one end of said platform for movement between a generally vertical position depending from said platform and a generally horizontal position extending outwardly from said platform, a toggle linkage pivotally connected at one end to the approach plate and at the opposite end to the underside of the platform for selectively retaining said approach plate in a horizontal position, means connected to the platform for facilitating the movement of the approach plate between the horizontal position and the vertical position and for urging the toggle linkage to an overcenter locked position, stop means mounted on the platform for releasably retaining the toggle linkage in an overcenter locked position and means mounted on the approach plate for selectively forcing said toggle linkage out of the overcenter locked position and for releasably locking the approach plate in the generally vertical position.

4. The structure of claim 3 further characterized in that the means for forcing said toggle linkage out of an overcenter locked position includes a roller, a lever movably mounted on the approach plate and means connecting said lever to the roller for operating the roller to force the toggle linkage out of the overcenter locked position upon moving the lever in the appropriate direction.

5. In a vehicle having a frame, a platform having a rear end, said platform being pivotally mounted on said frame for movement between an index position generally parallel relative to the frame, and means mounted on the platform for alternately forming an extension of said platform and forming a bumper, the last mentioned means including an approach plate, toggle linkage means connected at one end to the platform and at the opposite end to the approach plate for releasably retaining the approach plate in an extension position and spring counter balance means connected to the toggle linkage to urge the approach plate from a bumper position to an extension position to facilitate moving the approach plate between said positions.

6. In a vehicle having a frame, a platform having a rear end mounted on said frame, an approach plate, means mounting said approach plate for movement between a position forming a generally planar extension of the platform and a position serving as a bumper, means connected to the platform for retaining said plate in the extension position, the last mentioned means including overcenter lock means mounted on the platform and connected to the approach plate for releasably retaining the approach plate in an extension position, means for releasably locking the approach plate retaining means in a bumper position, a hand lever movably mounted on the vehicle and connected to the last mentioned locking means for operating said last mentioned locking means between a locking position and unlocking position and means connected to the hand lever to be operated thereby for forcing said overcenter lock means from a locked position to permit the approach plate being moved from an extension position to a bumper position.

7. In a vehicle having a frame, a platform having a rear end mounted on said frame, an approach plate mounted on the rear end of said platform for movement between a position forming a general planar extension of the platform and a generally vertically extending position in depending relation to the platform to serve as a bumper and means mounted on the platform for selectively releasably locking said plate in each of said positions, the aforementioned means including overcenter lock means mounted on the platform and connected to the approach plate for releasably lockingly retaining the approach plate in the extension position and means on the approach plate for cooperating with the overcenter lock means to releasably lock said plate in the bumper position.

References Cited in the file of this patent

UNITED STATES PATENTS

| | | |
|---|---|---|
| 1,537,457 | Bryan | May 12, 1925 |
| 1,586,532 | Pampinella | June 1, 1926 |
| 2,534,626 | Rubenstein | Dec. 19, 1950 |
| 2,727,781 | D'Eath | Dec. 20, 1955 |
| 2,758,729 | VanDusen | Aug. 14, 1956 |
| 2,850,187 | Roberts | Sept. 2, 1958 |
| 2,900,094 | Ferguson | Aug. 18, 1959 |
| 2,966,274 | Price | Dec. 27, 1960 |

FOREIGN PATENTS

| | | |
|---|---|---|
| 219,131 | Great Britain | July 24, 1924 |
| 462,957 | Canada | Feb. 7, 1950 |
| 645,237 | Great Britain | Oct. 25, 1950 |
| 692,147 | Great Britain | May 27, 1953 |